No. 834,813. PATENTED OCT. 30, 1906.
G. KNUTTGEN.
EGG TESTER.
MODEL. APPLICATION FILED MAR. 13, 1905.
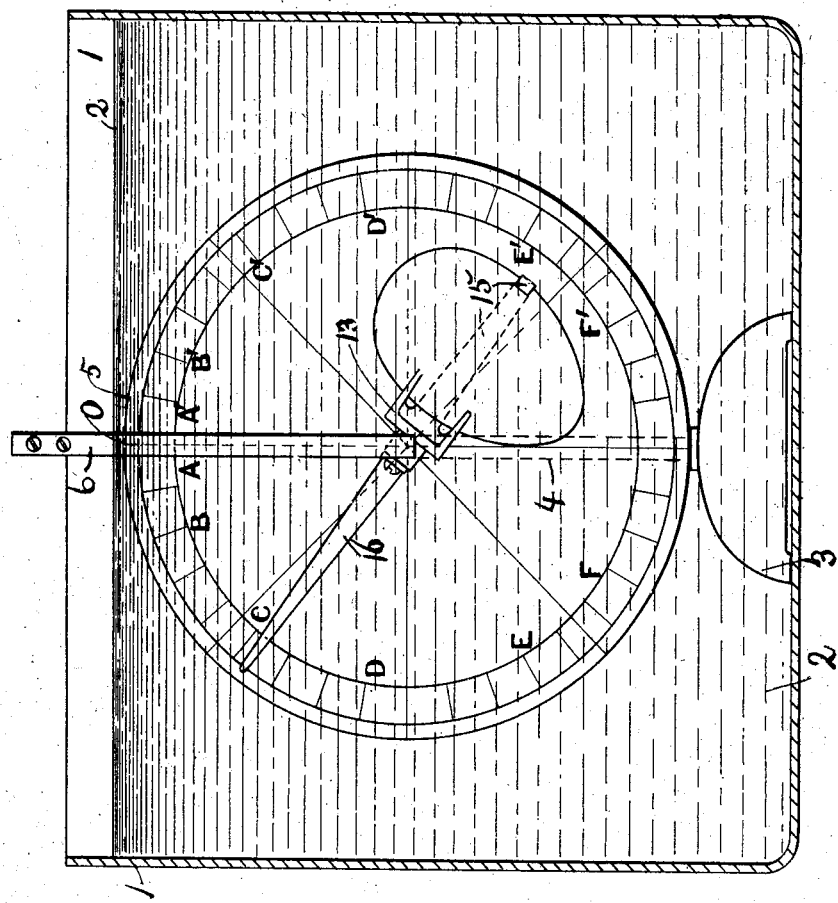
Fig. 1
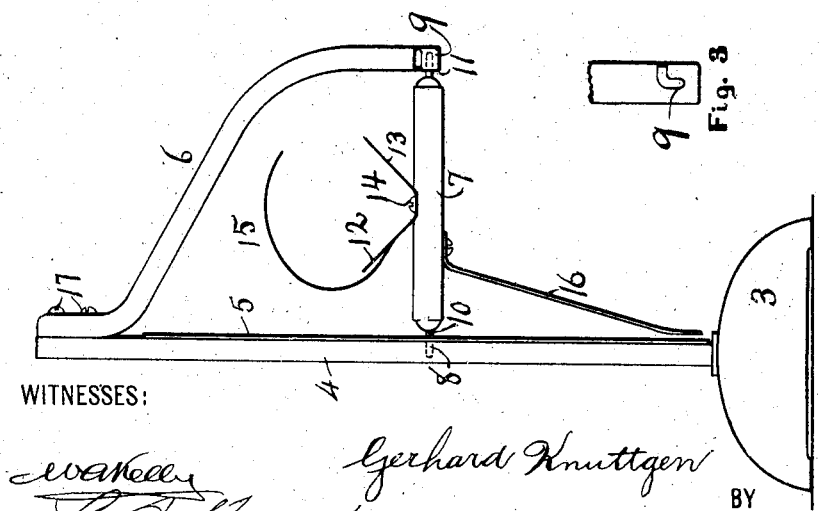
Fig. 3
Fig. 2
WITNESSES: INVENTOR
Gerhard Knuttgen
BY
Edward P. Thompson
ATTORNEY

UNITED STATES PATENT OFFICE.

GERHARD KNUTTGEN, OF OAKTREE, NEW JERSEY.

EGG-TESTER.

No. 834,813.  Specification of Letters Patent.  Patented Oct. 30, 1906.

Application filed March 13, 1905. Serial No. 249,844. (Model.)

*To all whom it may concern:*

Be it known that I, GERHARD KNUTTGEN, a citizen of the United States of America, and a resident of Oaktree, in the county of Middlesex and State of New Jersey, have invented certain new and useful Improvements in Egg-Testers, of which the following is a specification.

My present invention relates to a device for indicating whether an egg is fresh or not and also showing whether it is moderately good, so that one may know whether it is a new-laid egg, or at least fresh enough to eat new-laid, or if only suitable for cooking, or if unfit for any kind of use.

The object of the invention is to provide an apparatus suitable for the household or store, where it is necessary to test eggs without any special scientific knowledge or skill on the part of the operator. I have provided such an instrument that is simple to manufacture and can be sold at a reasonable price, durable, sufficiently accurate for the above-named degrees of quality of the eggs, and having but one movable part, and so less likely to get out of order.

Accordingly the invention consists, without pointing out the various scopes which are attended to in the claims, of a beam, one arm having an egg-holder consisting of two forks and a spring and the other arm being a counterpoise and at the same time a pointer, a horizontal arbor for the beam, the counterpoise being heavier than the other arm, a scale in the path of the pointer and suitably marked to indicate various qualities of eggs, the holder-arm being lighter than the counterpoise to the extent that when a new-laid egg is placed into the holder and the whole of the above-named elements and the egg submerged in water the pointer will point nearly vertically upward; but if the egg is bad the pointer will point ninety or more degrees from the vertical and for intermediate qualities the pointer will rest between those limits of degrees. The egg-shells should be intact.

By referring to the drawings, Figure 1 is a sectional view of the whole apparatus, including the vessel of water, and the egg itself which is shown applied to the tester for determining its quality. The instrument is therefore in a different phase from the normal. Fig. 2 is a side elevation of the main part of the testing apparatus, and it is that part which is for use in a vessel of water, the positions of the parts of the device being normal and the view in Fig. 1 being a front elevation. Fig. 3 is a fragmentary view of one of the bearings.

The mechanical construction, illustrating the manner of carrying out the invention in practice, consists of a vessel 1, containing water 2, and a balance having the following elements: a base 3 for resting on the bottom of the vessel 1, an upright 4, supported by said base, a scale 5, having graduations from the top point in both directions, as "A B C D E F" on the left of the central vertical line and "A'," "B'," "C'," "D'," "E'," and "F'" on the right, these divisions being located at the periphery of the circular scale 5, an arm 6, hanging down and outward from the top of the upright 5, an arbor 7, horizontal and having its bearings carried, respectively by said upright and said arm 6, the bearings being numbered 8 and 9, the former consisting of a hole 8, in which is one pivot 10, and the other bearing being a slot with the bearing-surface at the lower end, the slot being curved from the horizontal to a vertical direction, as indicated in Fig. 3.

On the upper side of the arbor 7 is an egg-holder consisting of two forks 12 and 13 at about right angles to each other and each about forty-five degrees to a vertical and fastened together and to the arbor, as shown at the screw 14. From between the tines of one fork there extends a circular spring around toward the other fork, thereby forming means for holding the egg up against the stiff forks, and the egg is thereby adjustable to and fro slightly through the circular spring and yet supported effectually. This spring is seen at 15.

On the opposite side of the arbor 7 from the egg-holder is a counterpoise 16, pointed and terminating opposite the scale graduations, and when rotated passing by the graduations of the scale 5. Screws 17 serve to hold the arm 6 to the upright 4.

I will now describe how to operate the whole apparatus.

First take the balance out of the water 2. Now insert an egg in the spring-holder 15 12 13 and adjust back and forth longitudinally of the egg and horizontally until the pointer stops at the top or zero part of the scale. This will be possible whether the egg is good, bad, or middling. The device must be so constructed that the weight of the egg plus the weight of the egg-holder will hold the pointer at zero in air and, if the egg is new-laid, somewhere between A and A' in water.

If the egg is bad, the needle will then go to somewhere in the neighborhood of between "E" and "F'." More particularly if new laid the pointer will locate itself from "O" to "A" if the big end of the egg is at the right of the spring 15 when in water; but if the egg is simply what may be called "fresh" the pointer will stand between "A" and "B." If good enough for eating as a boiled egg or poached, the pointer 16 will go between "B" and "C." If it is fresh enough to be suitable for cooking in cake, puddings, &c., the pointer will stand between "C" and "D." If the egg is stale, the pointer will stand between "D" and "E." If the egg is still less fresh and in the condition generally called "bad," the pointer will stand between the letters "E" and "F."

If the larger end of the egg stands at the left of the spring 15, then the pointer will travel toward the letters "A' B' C'," &c. This phenomenon is due to the air-filled space in the larger end of the egg.

If the egg is still worse in quality, the pointer will rotate and point nearly to the lowest point of the scale.

For large eggs, such as goose-eggs, I provide a separate and larger device; but two sizes are all that need be furnished on the market to answer all purposes. A single size will suffice for all hens' eggs.

I claim as my invention—

1. An egg-tester consisting of the combination of a vessel, a liquid therein, a balance-beam submerged in the liquid, one arm of the beam being an egg-holder and the other arm a counterpoise greater than the egg-holder in weight, a horizontal pivot for supporting said beam, and a scale along the path of the outer end of said counterpoise, said egg-holder being adapted to hold an egg in such position that its major axis is located in a plane to which the axis of said pivot is perpendicular.

2. An egg-tester consisting of the combination of a vessel containing a liquid, a base for standing on the bottom of said vessel and inside thereof, an upright supported by said base and having bearings thereon, an arbor having horizontal pivots located in said bearings, arms of a balance-beam extending from said arbor and entirely submerged in said liquid in all rotary directions of said beam about said pivots, one arm of said beam being pointed, the other arm being an egg-holder and of less weight than that of the pointed arm, said egg-holder being adapted to hold an egg in such position that its major axis is in a plane to which the axis of said pivots is perpendicular, and a scale along the path of the point of said pointed arm, for indicating the quality of an egg placed in said holder.

3. In an egg-tester, the combination of a vessel containing water, and means submerged in said water, for holding eggs of different quality at different depths and at different angular positions in said water, said means being controlled by the buoyancy of one end of each egg, the eggs being tested successively and only one at a time, said means consisting of a pivotally-mounted holder for the eggs.

4. In an egg-tester, the combination of a horizontal arbor, an egg-holder attached to one side of said arbor, for holding an egg with its major axis in a plane at right angles thereto, a counterpoise in the form of a pointer, and a fixed scale along the path of said pointer, said pointer being governed by the gas in one end of an egg in said holder, when the whole device is immersed in water.

5. An egg-tester consisting of the combination of an arbor, an egg-holder attached to one side of said arbor, for holding an egg with its major axis in a plane at right angles thereto, a counterpoise in the form of a pointer attached to the other side of said arbor, an upright carrying one of the pivots for said arbor, an arm extending from the top of said upright and carrying the other bearing for said arbor, horizontally opposite said first-named bearing, and a base-plate for said upright, said pointer being governed by the greater buoyancy of one end of the egg over that of the other end, when the whole device together with the egg is immersed in water.

6. In an egg-tester, the combination of an arbor, and an egg-holder attached to one side of said arbor and having two straight arms for the egg to rest against, and having a curved spring extending away from said arbor, for surrounding said egg and pressing the same between and against said arms, the relations of the various parts being such that a plane in which is located the axis of said arbor bisects said spring throughout its length and passes between said arms.

7. In an egg-tester, the combination of a vessel containing water, means submerged in said water for holding an egg at a height and at an angular position in said water dependent upon the quality of said egg and controlled by the variable buoyancy of one end of said egg, and a device for indicating the position of said egg in said water, said means consisting of a pivotally-mounted holder for the egg.

8. In an egg-tester, the combination of a horizontal arbor, an egg-holder attached to one side of said arbor, for holding an egg with its major axis in a plane at right angles thereto, a pointer, and a scale, one of the two last-named elements being attached to said arbor, said pointer and said scale being relatively movable for indicating the position of said egg-holder, the position of said egg-holder being determined by the gas in one end of the egg, when the egg is under water.

9. In an egg-tester, the combination of a vessel, water therein, and a device submerged in said water and consisting of an egg-holder and two relatively movable elements, one of said elements being carried by said egg-holder, and one of said elements being a scale and the other a pointer, the position of said egg-holder being governed by the rotative effect exerted on a horizontal axis at right angles to the major axis of a submerged egg held in said holder, by said egg.

10. In an egg-tester, an egg-holder consisting of the combination of a pair of straight parallel arms, another similar pair of arms at about right angles to the first pair, the two pairs diverging from each other, and a curved spring extending from between the arms of one pair outwardly and toward the space between the arms of the other pair, for surrounding an egg and pressing it between and against said pairs of arms.

11. An egg-tester consisting of the combination of a rotary egg-holder for holding an egg, water acting on the egg in the holder for moving the major axis of the egg from the horizontal line to an angle thereto, and means for indicating the angle.

In testimony whereof I have signed my name and affixed my seal this 4th day of March, 1905.

GERHARD KNUTTGEN. [L. S.]

Witnesses:
NATHAN MARKOWITZ,
MILFORD B. FERGUSON.